June 27, 1939.  M. LATHAM  2,163,733
UTENSIL
Filed Jan. 26, 1939  2 Sheets—Sheet 1

Inventor
M. Latham,

By Clarence A. O'Brien
and Hyman Berman
Attorneys

June 27, 1939.　　　M. LATHAM　　　2,163,733
UTENSIL
Filed Jan. 26, 1939　　　2 Sheets-Sheet 2
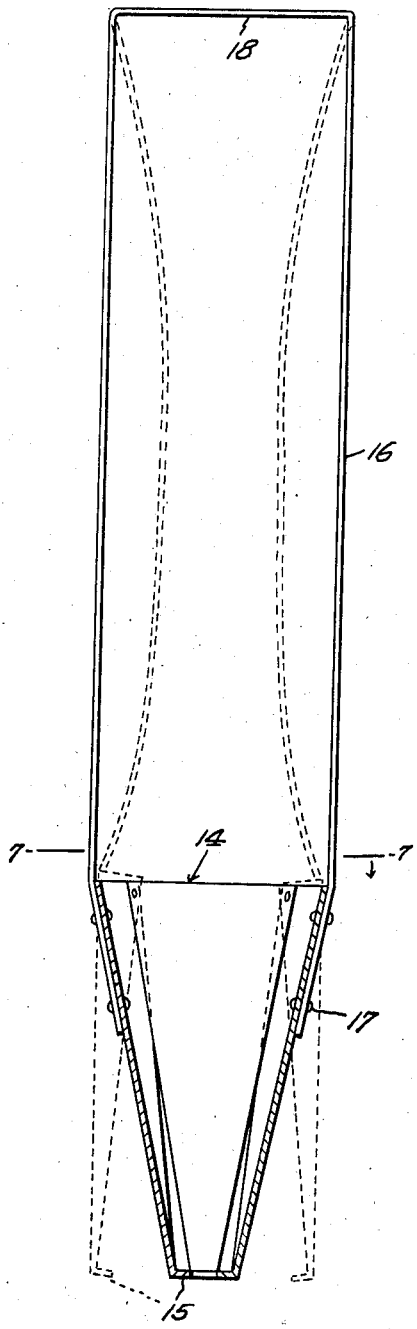
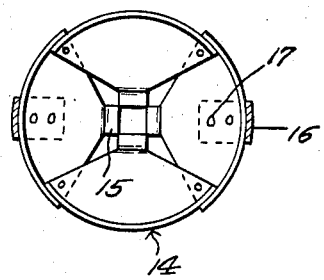
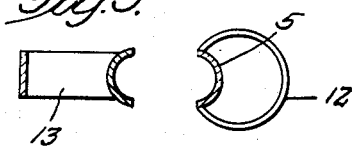
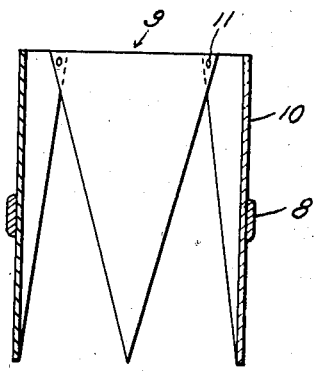
Inventor
M. Latham.
By Clarence A. O'Brien
and Hyman Berman
Attorneys Patented June 27, 1939

2,163,733

UNITED STATES PATENT OFFICE 2,163,733

UTENSIL

Maurice Latham, Jay, Maine

Application January 26, 1939, Serial No. 252,982

5 Claims. (Cl. 107—48)

This invention relates to utensils especially adapted for scooping up semiliquid material, such as ice cream, mashed potatoes and other similar foods, or may be employed for picking up food from boiling water, such as eggs, potatoes and the like, and has for the primary object the provision of an extremely efficient and inexpensive device of this character which consists of a cone-shaped body having a series of sections and an operating handle, whereby the sections may be caused to grip articles as that of jaws or said sections may be made to move in full contact with each other to form a scoop of the body and also made to pivot apart for opening of the scoop to allow the material taken up to slide freely therefrom without inverting the scoop.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a utensil constructed in accordance with my invention.

Figure 4 is a sectional view taken on the line 4—4 of Figure 3.

Figure 5 is a transverse sectional view taken on the line 5—5 of Figure 1.

Figure 6 is a vertical sectional view showing the device arranged for a utensil for picking up articles or objects such as eggs, potatoes, and the like from boiling water.

Figure 7 is a sectional view taken on the line 7—7 of Figure 6.

Figure 1:
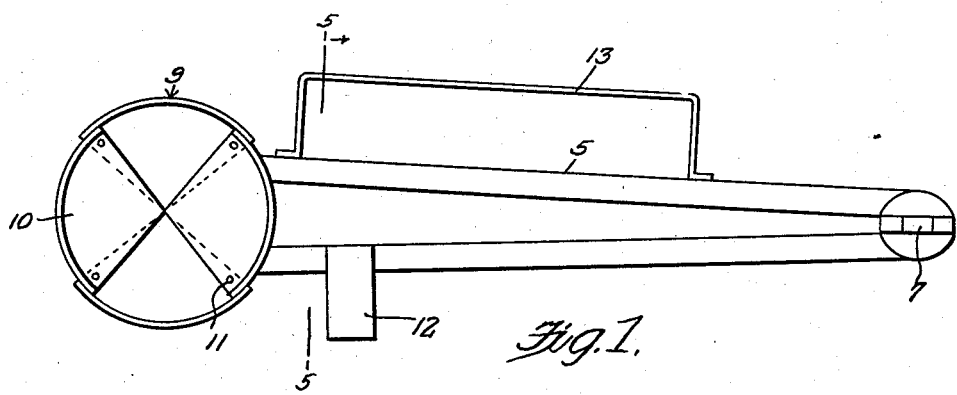
Figure 2:
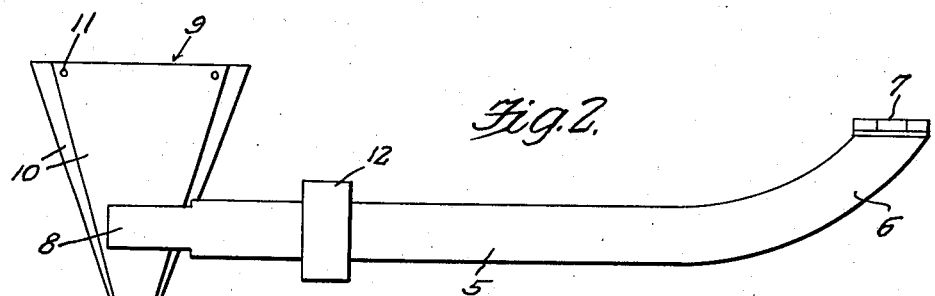
Figure 2 is a side elevation illustrating the device.
Figure 3:
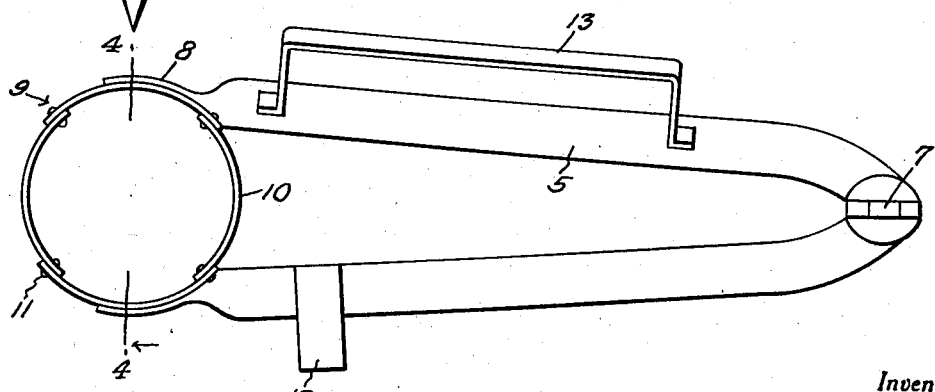
Figure 3 is a top plan view showing the device in an open position.

Referring in detail to the drawings, the numeral 5 indicates companion handles which include curved end portions 6 connected together by a hinge 7. The other ends of the handles are slightly reduced and arcuately curved to form attaching portions 8 secured in any well known manner to a conical-shaped body 9 composed of a series of sections 10 each of triangular shape and connected with each other by pivots 11. It is preferable that the sections 10 be arranged in pairs and the sections of one pair have the extensions 8 of the handles secured thereto and overlap and pivoted on the other pair of sections so that when the handles are moved toward each other the sections 10 are caused to move in closed position, that is, in fully overlapped relation forming the body of conical shape with the large end thereof open so as to permit the body to be used as a scoop. The movement of the handles away from each other brings about pivoting of the sections 10 relative to each other so that the sections move fully apart at their apex ends whereby the material taken up in the body may slide freely therefrom, consequently bringing about a quick and efficient emptying of the body of the material with very little effort on the part of the operator.

A device of the character described is especially useful for scooping up ice cream and forming the ice cream into cone shape and for depositing the molded ice cream into a cone of the conventional construction so that the molded ice cream will slide freely into and substantially fill the cone.

It is to be understood that the device may also be used for many other purposes such as for scooping up mashed potatoes and other semiliquid foods where it is desired to dish out such foods in predetermined amounts and in a particular shape.

One of the handles 5 has formed thereon a thumb guard 12 of semi-circular shape so that the thumb of the operator's hand may be readily inserted therein, while the other handle is equipped with a finger guard 13 through which the fingers of the hand may extend so that the handles may be readily gripped and pressed together and also may be readily moved apart.

Referring to the modified form of my invention, the body is indicated by the character 14 and is constructed similarly to the body 9 except that the apex ends of the sections are bent at right angles, as shown at 15, to have contact with each other when the sections of the body are brought into fully closed position so that the ends 15 will aid the sections in obtaining a grip on an object such as an egg or potato when desiring to lift the same from boiling water and will prevent such object from readily sliding outwardly between the sections during the handling thereof.

In this form of my invention flexible handles 16 are secured on opposite sections of the body, as shown at 17, and are integral with a connecting portion 18. When it is desired to spread the sections of the body apart the handles 16 are fixed in the direction of each other and when released will assume a position substantially parallel and straight bringing the sections of the body closed or in full lapping relation to each other.

It is believed that the foregoing description, when taken in connection with the drawings will fully set forth the construction and advantages of this invention to those skilled in the art to which such a device relates, so that further detailed description will not be required.

What I claim is:

1. A utensil comprising a conical shaped body including pairs of substantially triangular shaped sections each transversely curved, pivots connecting the sections, with one pair of sections having overlapping relation to the other pair of sections, and a handle for said body to bring about pivotal movement of the sections for opening and closing the body at the apex end thereof.

2. A utensil comprising a conical shaped body including pairs of substantially triangular shaped sections each transversely curved, pivots connecting the sections, with one pair of sections having overlapping relation to the other pair of sections, handles secured to the last-named pair of sections whereby said sections may be caused to pivot for opening and closing of the body at the apex end thereof.

3. A utensil comprising a conical shaped body including pairs of substantially triangular shaped sections each transversely curved, pivots connecting the sections, with one pair of sections having overlapping relation to the other pair of sections, handles secured to the last-named pair of sections whereby said sections may be caused to pivot for opening and closing of the body at the apex end thereof, and means connecting the handles.

4. A utensil comprising a conical shaped body including pairs of substantially triangular shaped sections each transversely curved, pivots connecting the sections, with one pair of sections having overlapping relation to the other pair of sections, handles secured to the last-named pair of sections whereby said sections may be caused to pivot for opening and closing of the body at the apex end thereof, a hinge connecting the handles, a thumb stall secured to one of the handles, and a finger guard secured to the other handle.

5. A utensil comprising a conical shaped body having pairs of substantially triangular shaped sections, pivots connecting said sections, with one pair of sections overlapping the other pair of sections, flexible handles secured on one pair of said sections, and a connecting portion joining said handles.

MAURICE LATHAM.